United States Patent [19]

Crosdale

[11] Patent Number: 4,776,698
[45] Date of Patent: Oct. 11, 1988

[54] MEASURING
[75] Inventor: Fitzroy H. Crosdale, Hamlin, N.Y.
[73] Assignee: Eastman Kodak Company, Rochester, N.Y.
[21] Appl. No.: 893,431
[22] Filed: Aug. 4, 1986
[51] Int. Cl.[4] .............................................. G01B 9/02
[52] U.S. Cl. ..................................... 356/345; 356/358
[58] Field of Search ................. 356/345, 358; 250/550
[56] References Cited

U.S. PATENT DOCUMENTS

| | | | |
|---|---|---|---|
| 2,462,292 | 2/1949 | Snyder, Jr. | 356/345 |
| 3,230,380 | 1/1966 | Cooke | 356/358 X |
| 4,212,073 | 7/1980 | Balasubramanian | 364/560 |
| 4,225,240 | 9/1980 | Balasubramanian | 356/360 |
| 4,552,457 | 11/1985 | Biallorenzi et al. | 356/345 |
| 4,566,794 | 1/1986 | Hanse | 356/350 |
| 4,641,972 | 2/1987 | Halioua et al. | 356/376 |
| 4,647,206 | 3/1987 | Kunzmann et al. | 356/358 |

FOREIGN PATENT DOCUMENTS 2159134 5/1972 Fed. Rep. of Germany .
2075180 11/1981 United Kingdom .

Primary Examiner—Davis L. Willis
Assistant Examiner—Matthew W. Koren
Attorney, Agent, or Firm—John B. Turner

[57] ABSTRACT

At least three detectors disposed on a line perpendicular to a straight line fringe pattern and on centers at one-fourth the fringe period provide signals indicative of the intensities of the pattern incident on them. The signals are manipulated to render equal the fringe intensity terms of the expressions from the sinusoidally varying signals as part of the procedure for deriving the phase value. Derivation of the phase value is a step in derivation of displacement. The fringes are created in an interferometric device or from a sinusoidally varying grating.

3 Claims, 8 Drawing Sheets

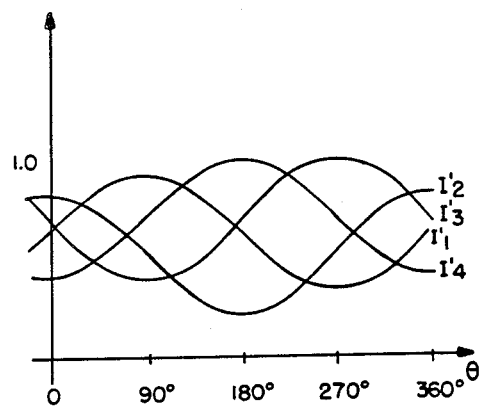
FIG. 10
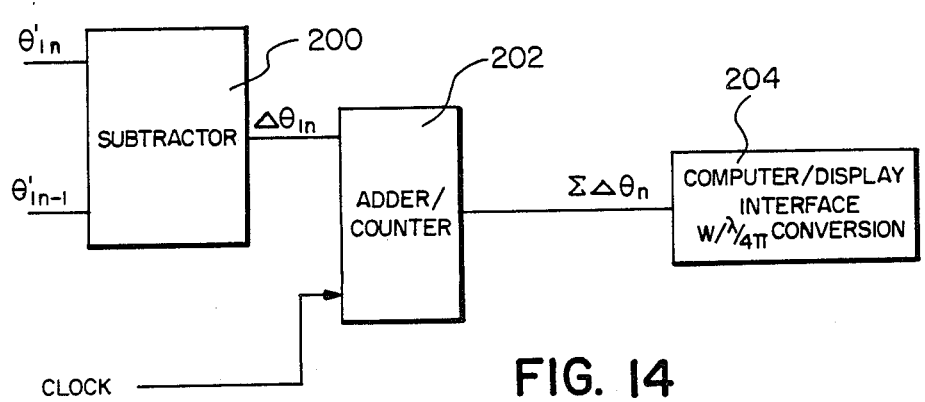
FIG. 14
FIG. 15
| SIN + | SIN + |
| COS − | COS + |
| TAN − | TAN + |
|---|---|
| SIN − | SIN − |
| COS − | COS + |
| TAN + | TAN − |

MEASURING

BACKGROUND OF THE INVENTION

1. Field of the Invention

This invention relates to measuring, and more particularly, but not exclusively, it relates to interferometers.

2. Description Relative to the Prior Art

In interferometry it is known that when a straight line fringe pattern is scanned perpendicularly to the fringe orientation, the intensity values detected define a sinusoidal function:

$$I_x = A_x + B_x \cos(2\pi f_o x + \theta_o)$$

wherein:
- x is a spatial variable
- $A_x$ is average intensity
- $B_x$ is fringe intensity
- $f_o$ is spatial frequency
- $\theta_o$ is phase value ($4\pi \Delta L/\lambda$)
- $\Delta$ is path length difference ($L_T - L_R$)
- $\lambda$ is wavelength of source.

The phase term, $\theta_o$, is related to the path length difference, $\Delta L$, between the two light beam paths, i.e., the path of fixed length ($L_R$) and the path of variable length ($L_T$). Thus, when $\Delta L$ changes, so does phase. Therefore, the ability to derive the phase provides direct access to displacement of the probe which controls the path length of the variable length path.

Two known techniques in interferometry have been termed Temporal Phase Shift Interferometry (TPSI) and Four Photodetector (FP), respectively.

TPSI is used in a commercially available instrument for surface profiling work. TPSI relies on a single photodetector to calculate the phase value. Therefore, with the single detector initially detecting an intensity given by $$I_1 = A + B \cos \theta_1$$

wherein $\theta_1 = 2\pi f_o x_1 + \theta_o$
after $\Delta L$ is changed by $\lambda/8$, then $$I_2 = A + B \sin \theta_1$$

and after $\Delta L$ is changed by $\lambda/8$ again, then $$I_3 = A - B \cos \theta_1$$

The phase term, $\theta_1$, is given by $$\theta_1 = \arctan \frac{I_1 + I_3 - 2I_1}{I_1 - I_3}$$

The FP technique uses four photodetectors disposed in a linear array extending perpendicularly to the fringe pattern. The centers of the individual detectors are spaced apart distance d with d being equal to ($1/4f_o$), i.e., one-fourth the fringe period.

Thus, the intensity detected instantaneously by the four photodetectors is $$I_1 = A_1 + B_1 \cos \theta_1$$

$$I_2 = A_2 + B_2 \sin \theta_1$$

$$I_3 = A_3 - B_3 \cos \theta_1$$

$$I_4 = A_4 - B_4 \sin \theta_1$$

where
$\theta_1 = 2\pi f_o x_1 + \theta_o$ and
$x_1$ = position of the first photodetector.

Because four photodetectors are used in FP, as opposed to the single photodetector in TPSI, electrical gain and optical intensity variations render the $A_x$ and $B_x$ coefficients different. This prevents the use of the same simple mathematical manipulation to determine the phase value. The FP technique accepts the variations in coefficients and simply detects transitions above or below the average value terms, $A_x$. The technique in accordance with the present invention, which might be termed Spatial Phase Shift Interferometry (SPSI), on the other hand, seeks to manipulate the intensity values to a form that allows high resolution phase calculations.

SUMMARY OF THE INVENTION

According to the present invention, the outputs from detectors are manipulated so that the fringe irradiance values $B_x$, are made equal. Thus, after manipulation:

$$I_1' = A_1' + B \cos \theta_1$$

$$I_2' = A_2' + B \sin \theta_1$$

$$I_3' = A_3' - B \cos \theta_1$$

$$I_4' = A_4' - B \sin \theta_1$$

Terms related to the optical power of the system can be expressed as $$P_1 = I_1' + I_3' = A_1' + A_3' \text{ and}$$

$$P_2 = I_2' + I_4' = A_2' + A_4'$$

For many photodetector applications, the value of $P_1$ is directly proportional to $P_2$. Therefore, the value of $A_1'$; $A_2'$; $A_3'$; and $A_4'$ can all be defined from either $P_1$ or $P_2$. Therefore,

| | | | | | |
|---|---|---|---|---|---|
| $A_1'$ | = | $k_1 P_1$ | or | $A_1'$ | = $k_1' P_2$ |
| $A_2'$ | = | $k_2' P_1$ | or | $A_2'$ | = $k_2 P_2$ |
| $A_3'$ | = | $k_3 P_1$ | or | $A_3'$ | = $k_3' P_2$ |
| $A_4'$ | = | $k_4' P_1$ | or | $A_4'$ | = $k_4 P_2$ | where
$o < k_x < 1$ and
$o < k_x' x = 1, 2, 3, 4$

Thus, according to the present invention, the phase can be defined using only three detectors disposed on centers at ($1/4f_o$), as follows:

$$\theta_1 = \arctan \frac{I_2' - k_2' (I_1' + I_3')}{I_1' - k_1 (I_1' + I_3')}$$

To determine the displacement associated with the phase calculated requires deriving the difference between the currently determined phase and the immediately previously determined phase. The difference is then multiplied by the conversion factor ($\lambda/4\pi$) and the result is accumulated. Thus $$\theta_1 = \arctan \frac{I_2' - k_2'(I_1' + I_3')}{I_1' - k_1(I_1' + I_3')} = 2\pi f_o x_1 + \theta_o$$

$$\theta_o = \frac{4\pi}{\lambda}(L_T - L_R)$$

$2\pi f_o x_1$ is a constant offset that relates to the arbitrary placement of the detector array in the interference pattern. No displacement information is given by the $2\pi f_o x_1$ term. Therefore, it must be eliminated. $L_R$ is a fixed term which again relays no displacement information. Therefore, it too must be eliminated. To derive displacement information and eliminate non-related terms, the difference between successive phase readings is calculated, accumulated and multiplied by a proportionality constant.

$$\theta_{1n-1} = 2\pi \left[ f_o x_1 + \frac{2}{\lambda}(L_{Tn-1} - L_R) \right]$$

$$\theta_{1n} = 2\pi \left[ f_o x_1 + \frac{2}{\lambda}(L_{Tn} - L_R) \right]$$

Displacement = $\Delta L_{Tn}$ $\Delta L_{Tn} = L_{Tn} - L_{Tn-1}\alpha[\theta_{1n} - \theta_{1n-1}]$ Total Displacement = $\Delta L_T$ $$\Delta L_T = \frac{\lambda}{4\pi} \sum_{n=1}^{\infty} [\theta_{1n} - \theta_{1n-1}]$$

Note for no displacement $\Delta L_{Tn} = 0$

BRIEF DESCRIPTION OF THE DRAWINGS

An embodiment of the present invention will now be described, by way of example, with reference being made to the accompanying drawings, in which:

FIG. 10 represents the plot of FIG. 9 with adjustments made to give the same AC response in each of the four signals;

FIG. 14 illustrates another portion of the circuit partially illustrated in FIGS. 12 and 14;

FIG. 15 represents the relationship between the signs of sine and cosine terms and the phase quadrants.

DETAILED DESCRIPTION OF THE PREFERRED EMBODIMENT

An interferometric instrument embodying the present invention will now be described which is intended for measuring displacement of a part during a manufacturing operation.

Figure 1:
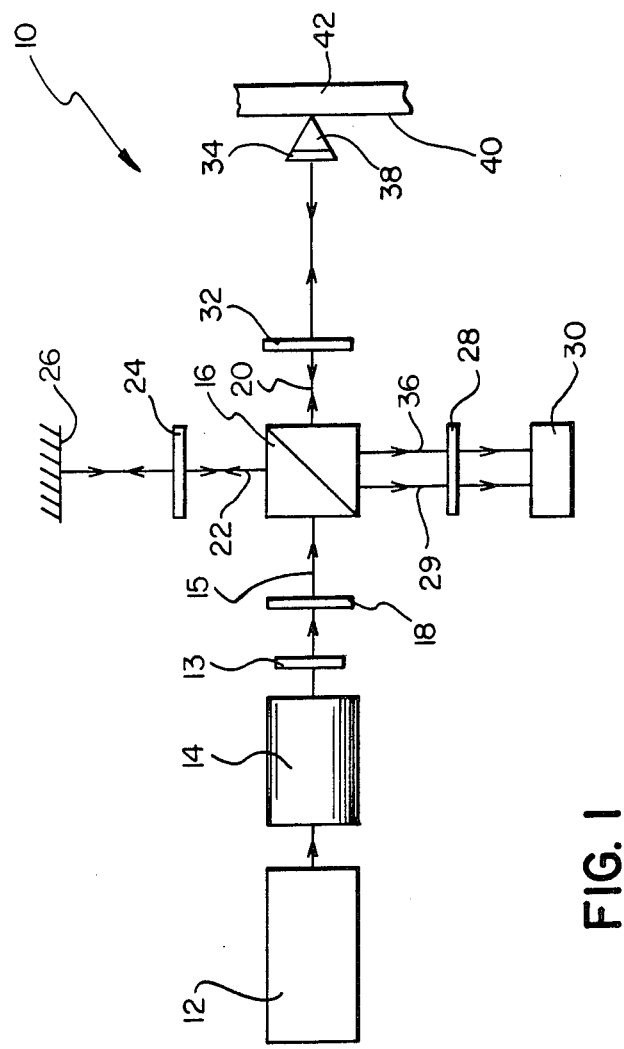
FIG. 1 schematically represents an interferometer embodying the present invention.

Reference is now made to FIG. 1 of the drawings which schematically represents an interferometer 10 embodying the present invention. The interferometer 10 includes a source of electromagnetic radiation of a single, constant wavelength, in the present embodiment a wavelength-stabilized laser diode 12. The actual wavelength of the radiation emitted by the laser diode 12 is not important to the invention but, in the present case wherein the laser diode is a Hitachi Model 8312, the wavelength of the radiation it produces is $0.824\mu$. The beam of radiation emitted by the laser diode is passed through an expander collimator 14 which directs an expanded and collimated beam 15 towards a splitter 16 by which the beam 15 is split into second and third beams 20 and 22, respectively. Between the expander collimator 14 and the splitter 16 there is a polarizing plate 18 which polarizes the radiation beam at 45° so that the intensities of the transmitted and reflected beams 20 and 22, respectively, are equal. Between the collimator 14 and the polarizing plate 18 there is a neutral density filter 13 to strongly attenuate any return beam to prevent any optical feedback to the laser diode 12.

The reflected beam 22 passes through a quarter-wave plate 24 and is then incident on a stationary reflector 26 which reflects the beam back along its path through the quarter-wave plate 24 to the beam splitter 16. By virtue of the polarization imposed by the quarter-wave plate 24, the beam is transmitted by the beam splitter 16 with minimal reflection towards the plate 18. The beam reflected by the reflector 26 passes on from the splitter 16, as beam 29, through a polarizing plate 28 and is incident upon a sensor array 30.

The beam 20, which had been transmitted by the splitter 16, passes through a quarter-wave plate 32 and is incident on a reflector 34 which, in the present embodiment, is in the form of a catseye retroreflector. The reflector 34 reflects the beam back upon itself through the quarter-wave plate 32 to the splitter 16 wherein, by virtue of its polarization imposed by the plate 32, it is substantially entirely reflected, as beam 36, towards the sensor array 30 upon which it is incident with only minimal energy being transmitted. This transmitted energy is attenuated by the neutral density filter 13.

The reflector 26 is stationary but the reflector 34 is associated with a probe 38 in contact with the surface 40 of a part 42 being operated upon and liable to displacement, during a manufacturing operation. The polarizing plate 28 imposes the same polarization on the two beams 29 and 36 so that they inherently have the capability of interfering. The paths 15, 22, 29 and 15, 20, 36 have path lengths which may be termed $L_R$ and $L_T$, respectively. $L_R$ is of fixed length and $L_T$ is of variable length. The difference in path lengths is $\Delta L$. Because there is a difference in path length the two beams interfere and create a straight line fringe pattern, a portion of which is represented in FIG. 2.

Figure 2:
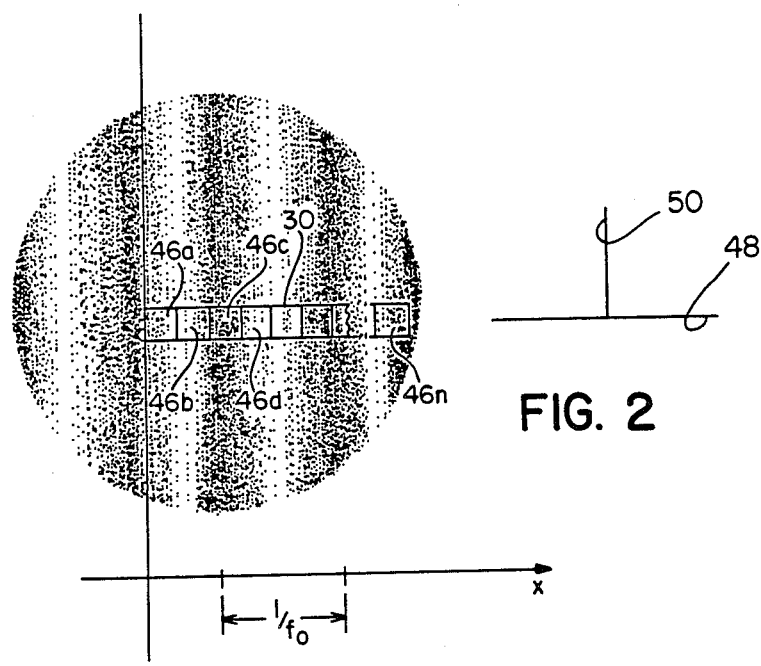
FIG. 2 represents a straight line fringe pattern created in the interferometer illustrated in FIG. 1, with a detector array diagramatically represented.
Figure 3:
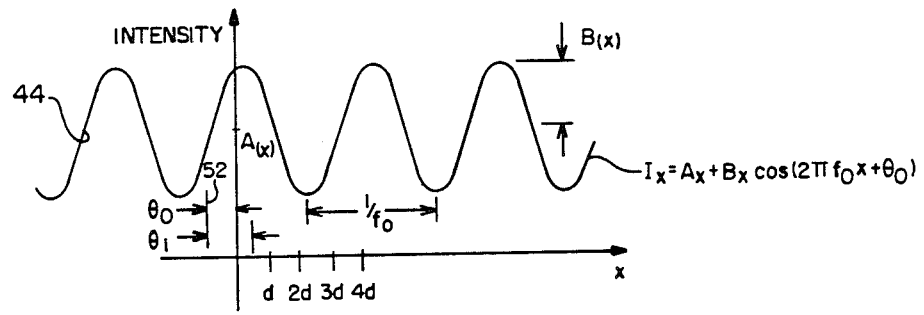
FIG. 3 is a plot of the intensity of illumination in the pattern illustrated in FIG. 2, along the line occupied by the detector array.

FIG. 2 represents a portion of the fringe pattern which is of sinusoidal intensity, as represented by the sine curve 44 in FIG. 3. The period of the curve 44, in the x direction, is shown in FIGS. 2 and 3 as $(1/f_o)$ ($f_o$ being the spatial frequency of the fringes).

FIG. 2 also shows the sensor array 30 which includes a plurality of detectors 46a, 46b, 46c, 46d ... 46n. In FIG. 2, the detectors are shown as contiguous for the sake of convenience. However, they are more accurately represented in FIGS. 4, 5 and 6, wherein they are small and discrete but can still be formed in an array. The array 30 is in a plane perpendicular to the beams 29 and 36 and the individual detectors 46 are disposed along a line 48 perpendicular to lines 50 of uniform intensity in the fringe pattern. The detectors 46 have their centers spaced distance d apart. Dimension 'd' is equal to a quarter of a fringe period, i.e. $d=(1/4f_o)$.

FIG. 3 is a sinusoidal curve representing the perfect case intensity of illumination in the fringe pattern of FIG. 2. The curve might be that generated by the signal from a single small detector scanned through the fringe pattern as produced by two uniform beams. The purpose of FIG. 3 is to show the relationship of various terms and parameters.

$\theta_o$ is the phase term and is related to the path length difference $\Delta L$ i.e., $(=L_T-L_R)$, between the two paths, i.e. of beams 15, 22, 29 and beams 15, 20, 36. Changes in path length due to change in the position of the probe 38 generate a change in phase. Thus, the ability to derive the phase $\theta_o$, provides direct access to displacement of the probe.

$$\theta_o=4\pi\Delta L$$

$$\theta_1=2\pi f_o x+\theta_o$$

$A_x$ is the average intensity of the fringe pattern.

$B_x$ is the fringe intensity, i.e., the value of the maximum intensity above the average intensity. It may also be termed the amplitude.

$I_x$ is the intensity of the illumination in the pattern at location x, and is given by $$I_x=A_x+B_x \cos (2\pi f_o x+\theta_o).$$

As stated above, the curve represented in FIG. 3 is that for a perfect situation. In reality this does not occur for reasons now to be considered.

Adjacent detectors have different intensities of light incident on them by virtue of the sinusoidal form of the fringe pattern. If no other effects were involved, these intensities would be given by $$I_1=A_1+B_1 \cos \theta_1 f_o \text{ detector } 46a$$

$$I_2=A_2+B_2 \cos \theta_1 f_o \text{ detector } 46b$$

$$I_3=A_3+B_3 \cos \theta_1 f_o \text{ detector } 46c$$

$$I_4=A_4+B_4 \cos \theta_1 f_o \text{ detector } 46d$$

Figure 4:
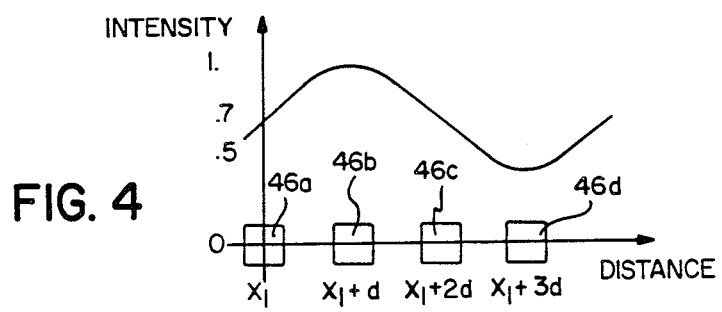
FIG. 4 represents the intensity for a single ideal fringe, with the spatial relationship of the sensors of the detector array indicated.

This is represented in FIG. 4 which shows a curve for intensity against distance for a single ideal fringe whose spatial period is exactly matched to the length of the array of four detectors. The detectors are represented in FIG. 4 and it will be seen that they are relatively small and spaced rather than contiguous. The curve in FIG. 4 follows $I_x=0.7+0.3 \cos \theta_1$.

Figure 5:
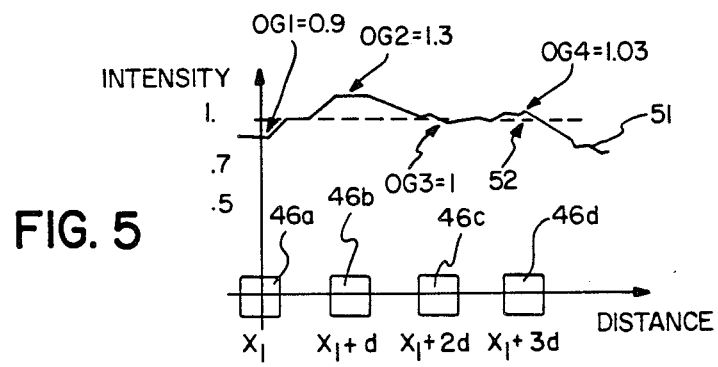
FIG. 5 represents an intensity profile assuming no interference of the two beams but showing lack of uniformity.

However, the intensity of the two beams 29 and 36 is not spatially uniform. FIG. 5 represents a possible intensity profile 51 which would be present over the detectors if the two beams 29 and 36 were present without interference. The lack of uniformity of intensity may be due to dust, hot spots, internal reflections, etc. The line 52 at intensity of 1 represents an ideal intensity. The plot is, of the actual intensity and it can be seen that there is an optical gain (OG) in the intensity on the four detectors of 0.9; 1.3; 1.0; and 1.03, respectively.

Figure 6:
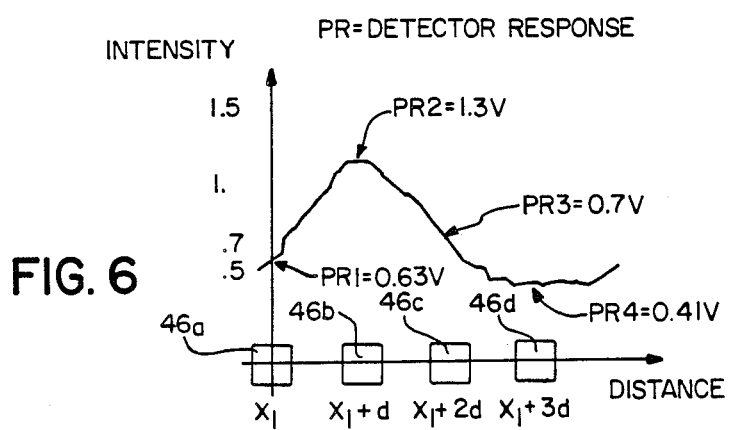
FIG. 6 represents the actual intensity profile.

FIG. 6 represents the intensity against distance profile of the actual fringe shape containing the noise illustrated in FIG. 5. The expected response (PR) of each detector, if all the detectors had the same gain, is also shown. Thus, it can be seen that the perfect situation 0.7 intensity incident on detector 46a in FIG. 4 with the optical gain of 0.9 would give an actual intensity signal of about 0.63. Similarly, the perfect situation intensity of 1 incident on detector 46b but with the noise optical gain (OG2) of 1.3, gives an intensity signal of about 1.30. The similarly derived signals from detectors 46c and 46d would be 0.7 and 0.41, respectively. However, the four detectors have different gains.

Figure 7:
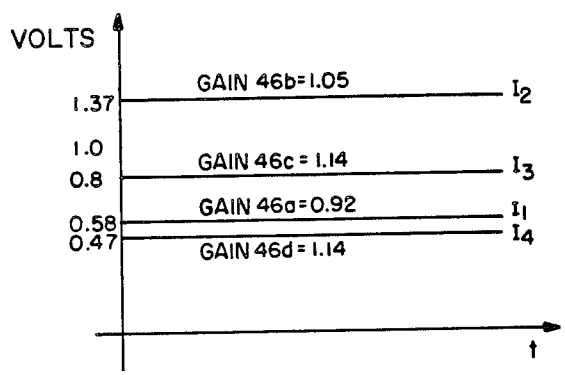
FIG. 7 represents a voltage against time plot of the output of each of the detectors when illuminated by the intensities shown in FIG. 6.

FIG. 7 illustrates a voltage against time plot of the output of each detector when illuminated by the intensities shown in FIG. 6 but taking into account the different gains of the detectors (i.e., gains of 0.92; 1.05; 1.14 and 1.14 for the detectors 46a; 46b; 46c; and 46d, respectively).

Figure 8:
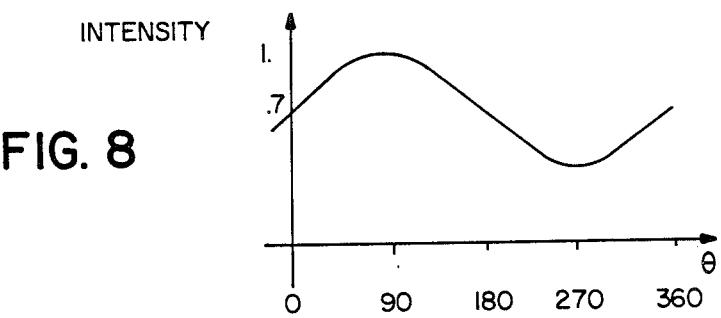
FIG. 8 represents a single period of an ideal fringe pattern.

FIG. 8 represents a single period of an ideal fringe pattern which is changing phase, i.e., the fringe is moving because the part 42, and with it the probe 38 and its associated reflector 34 is moving.

Figure 9:
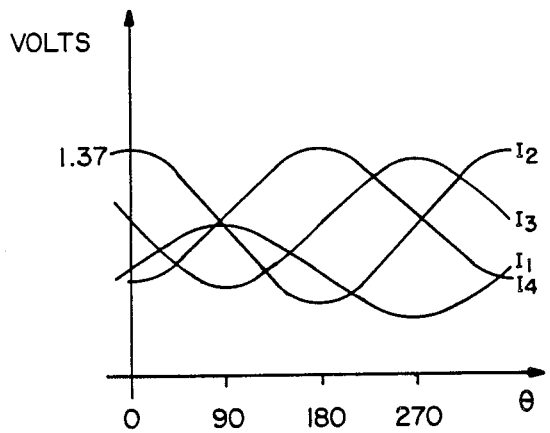
FIG. 9 represents a voltage against phase plot for each of the four sensors viewing a moving fringe pattern.

FIG. 9 represents a voltage against phase plot for each detector 46a–46d viewing a moving fringe pattern. The position of each detector is as shown in FIG. 4. The signals shown embody the effect of the noise considered in relation to FIG. 5 and the differing responses of the detectors, as considered in relation to FIG. 6. Thus, each detector's output is sinusoidal even in the presence of the noise and the optical gains considered in relation to FIG. 5 and the electrical gains considered in relation to FIG. 7. Thus, the signals from the detectors have different average power $A_x$ and different fringe power $B_x$ signal levels.

For the example illustrated in FIG. 9

$$I_1=0.58+0.25 \cos (90-\theta)$$

$$I_2=0.95+0.42 \sin (90-\theta)$$

$$I_3=0.8-0.34 \cos (90-\theta)$$

$$I_4=0.82-0.35 \sin (90-\theta)$$

$$\theta_1=90-\theta$$

FIG. 10 represents a voltage against phase plot for the four detectors with adjustments having been made to give the same AC response, i.e., to make the $B_x$ terms equal at 0.3. The desired AC response is chosen arbitrarily. It should be noted that simply matching the gain of each of the detectors will not provide the results shown, since the detector gain is only one source of gain error. With these adjustments:

$$I_1' = 0.7 + 0.3 \cos(90-\theta)$$

$$I_2' = 0.7 + 0.3 \sin(90-\theta)$$

$$I_3' = 0.7 - 0.3 \cos(90-\theta)$$

$$I_4' = 0.7 - 0.3 \sin(90-\theta)$$

In the example, it is assumed that the detector outputs ($I_1$, $I_2$, $I_3$ and $I_4$) are defined solely by the product of the gain terms (optical and electrical) and the intensity incident on the detectors. As a result, the procedure described to make equal the AC amplitude response of the detectors ($B_x$ terms) also resulted in equal DC response ($A_x$ terms). The result demonstrated is not impossible but highly unlikely. The output of a detector is in actuality, derived due to the integrating of the incident light over the aperture of the detector's active area. The action of integration, is related to ratio of the size of the active area to the center-to-center spacing and has significant non-linear effects on the detector's response. The smaller the ratio, the more linear the output and the more likely the condition described in the example. Therefore, integration introduces another factor which increases th likelihood of variation between the detector's DC response ($A_x$ terms). The SPSI technique will provide reliable phase results despite the effects of integration.

It is known in the prior art to use four detectors sensing a single period of a fringe pattern at 90° phase intervals. In the prior art the $A_x$ terms are manipulated to become equal and the variations in the $B_x$ terms are accepted and merely transitions above or below the average value terms, $A_x$, are detected by a comparator. In accordance with the present invention, the fringe intensity terms $B_x$ are manipulated to a form which allows high resolution calculations.

Thus, the outputs of the detectors 46a–46d after manipulation, in accordance with the invention, to make the fringe intensity terms equal, are given by:

$$I_1' = A_1' + B \cos \theta_1$$

$$I_1' = A_2' + B \sin \theta_1$$

$$I_3' = A_3' - B \cos \theta_1$$

$$I_4' + A_4' - B \sin \theta_1$$

A term P related to the optical power is given by $$P_1 = I_1' + I_3' + A_1' + A_3' \text{ and}$$

$$P_2 = I_2' + I_4 = A_2' + A_3'$$

For many detectors, the value of $P_1$ is directly proportional to $P_2$. Therefore, the value of $A_1'$; $A_2'$; $A_3'$ and $A_4'$ can all be determined from either $P_1$ or $P_2$. Therefore, $$A_1' = k_1 P_1 \text{ or } A_1' = k_1' P_2$$

$$A_2' = k_2' P_1 \text{ or } A_2' = k_2 P_2$$

$$A_3' = k_3 P_1 \text{ or } A_3' = k_3' P_2$$

$$A_4' = k_4' P_1 \text{ or } A_4' = k_4 P_2$$

where
$0 < k_x < 1$ and
$0 < k_x'$ where $x = 1, 2, 3, 4$.

Thus, the phase can be determined using only three detectors, e.g., 46a, 46b, 46c as follows:

$$\theta_1 = \arctan \frac{I_2' - k_2'(I_1' + I_3')}{I_1' - k_1(I_1' + I_3')}$$

To determine the displacement associated with the phase calculated requires deriving the difference between the currently determined phase and the immediately previously determined phase. The difference is then multiplied by the conversion factor ($\lambda/4\pi$) and the result is accumulated. Thus $$\theta_1 = \arctan \frac{I_2' - k_2'(I_1' + I_3')}{I_1' - k_1(I_1' + I_3')} = 2\pi f_o x_1 + \theta_o$$

$$\theta_o = \frac{4\pi}{\lambda}(L_T - L_R)$$

$2\pi f_o x_1$ is a constant offset that relates to the arbitrary placement of the detector array in the interference pattern. No displacement information is given by the $2\pi f_o x_1$ term. Therefore, it must be eliminated. $L_R$ is a fixed term which again relays no displacement information. Therefore, it too must be eliminated. To derive displacement information and eliminate non-related terms, the difference between successive phase readings is calculated, accumulated and multiplied by a proportionality constant.

$$\theta_{1n-1} = 2\pi \left[ f_o x_1 + \frac{2}{\lambda}(L_{Tn-1} - L_R) \right]$$

$$\theta_{1n} = 2\pi \left[ f_o x_1 + \frac{2}{\lambda}(L_{Tn} - L_R) \right]$$

Displacement = $\Delta L_{Tn}$ $$\Delta L_{Tn} = L_{Tn} - L_{Tn-1} a[\theta_{1n} - \theta_{1n-1}]$$

Total Displacement = $\Delta L_T$ $$\Delta L_T = \frac{\lambda}{4\pi} \sum_{n=1}^{\infty} [\theta_{1n} - \theta_{1n-1}]$$

Note, for no displacement $\Delta L_{Tn} = 0$

Figure 11:
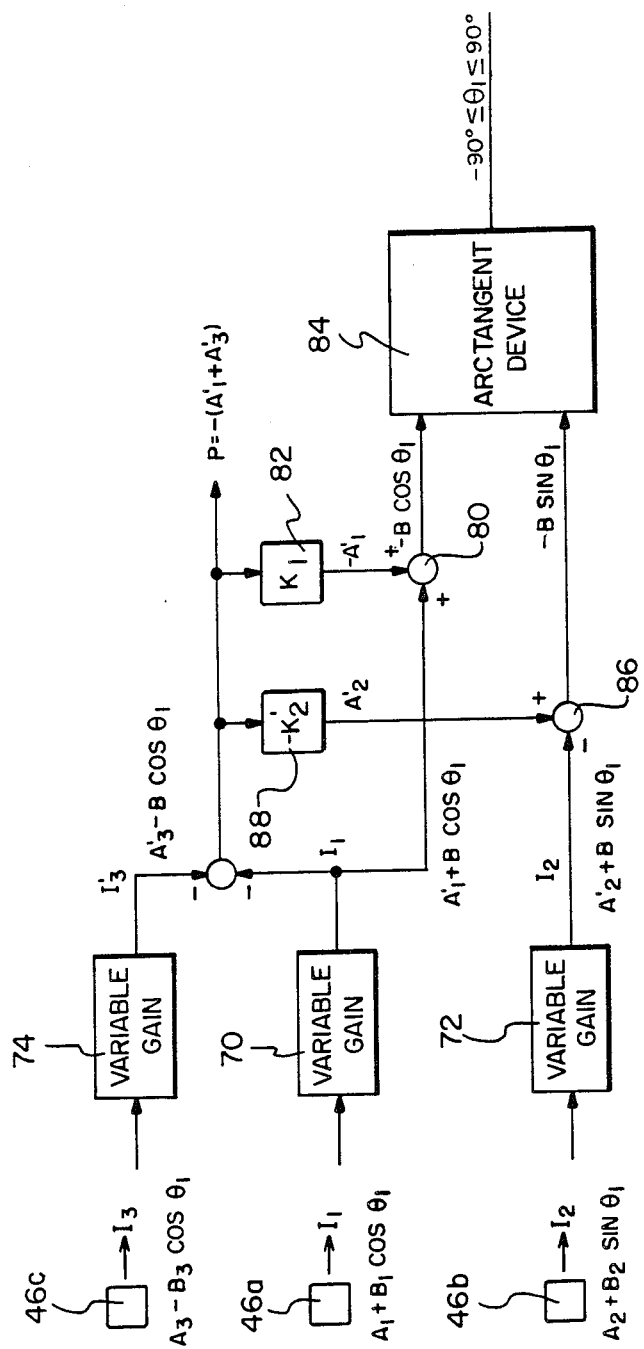
FIG. 11 illustrates schematically a manner of processing the signals.

FIG. 11 illustrates schematically the principles of a manner of processing signals from the detectors, in accordance with the present invention. Input currents $I_1$, $I_2$ and $I_3$ are the outputs of photodiodes 1, 2, and 3 (see FIG. 12) respectively, with each of the signals taking the following forms:

$$I_1 = A_1 + B_1 \cos \theta_1$$

$$I_2 = A_2 + B_2 \sin \theta_1$$

$$I_3 = A_3 - B_3 \cos \theta_1$$

Each of these signals is fed to respective variable amplifiers 70, 72, and 74 which are used to adjust the gain of the individual signals so that the "B" term, which corresponds to the amplitude of the sinusoid, is the same in each instance. After completion of this operation, variable gain amplifier 74 has as its output $I_3'$, that is $A_3'-B \cos \theta_1$. This is combined with the output of variable gain amplifier 70 which is $I'$, that is $A_1'+B \cos \theta_1$. The signals $I_1'$ and $I_3'$ are combined in adder 78, the output of which is $-P$ or $-(A_1'+A_3')$, a term which relates to the optical power of the system.

A portion of the output from variable gain amplifier 70 is fed to an adder 80. The output $-P$ of adder 78 is directed through a multiplier circuit 82 which may take the form of a variable resistor. The output of the multiplier circuit 82 is $A_1'$, or $-K_1P$, which is added to the $I_1'$ signal by the adder 80, resulting in $-B \cos \theta_1$ being sent to the denominator input of an arctangent device 84.

The output of variable gain amplifier 72 is $I_2'$, or $A_2'+B \sin \theta_1$, which is directed to one of the inputs of adder 86. The output signal $-P$ of adder 78 is directed to the input of multiplier circuit 88 which multiplies the input signal $-P$ by a constant $-K_2$ resulting in an output of $A_2'$. The output of the multiplier circuit 88 is subtracted from $I_2'$ in the adder 86, resulting in the output of the adder 86 being $-B \sin \theta_1$ which is then fed to the numerator input of arctangent device 84 which provides an output signal equal to $\theta_1$. If desired, and not shown in FIG. 11, this signal $\theta_1$ may be converted to a digital signal the value of which may be combined with the sign of the $-B \sin \theta_1$ and $-B \cos \theta_1$ terms and compared to those in a look-up table to provide $\theta_1$ between 0° and 360°.

Figure 12:
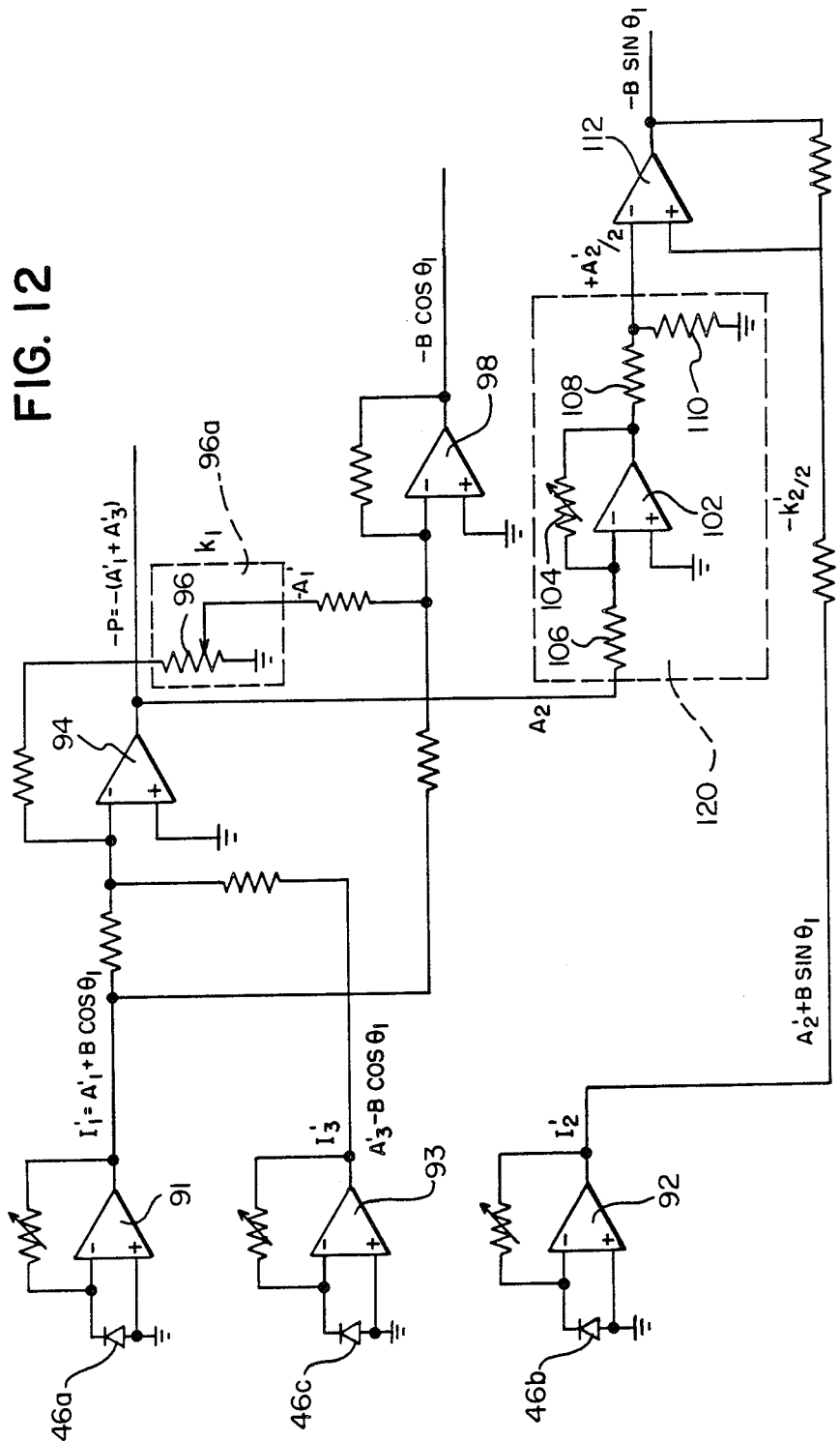
FIG. 12 illustrates a portion of a circuit for implementing the processing illustrated in FIG. 11.

FIG. 12 is a diagram which illustrates a circuit for the implementation of the block diagram in FIG. 11.

The output signals of the detectors 46a, 46b, 46c, which, in the present example, are photodiodes, provide the input signals to operational amplifiers (OP AMPS) 91, 92, and 93, respectively, which amplify the signals from the respective photodiodes with variable gain such that the AC function, i.e. the "B" term, in the three equations set forth earlier, are made equal. The outputs of OP AMPS 91 and 93 are added to provide a sum $-P$ which, if the period of the fringes are matched to the spacing of the photodiodes, should result in a function which relates to the optical power of the system. From this power-related function one may derive $A_1'$, $A_2'$, and $A_3'$.

The combined output signals from OP AMPS 91 and 93 are fed to the input of OP AMP 94 which provides a fixed gain to the signal with its primary function resulting in the sum of $I_1'$ and $I_3'$ and the reversal of the arithmetic sign. The output of OP AMP 94 $[-P=-(A_1'+A_3')]$ is attenuated through variable resistor 96 and provides a predetermined amount of attenuation to the output signal of OP AMP 94 resulting in signal $-A_1'$. The portion of the circuit within the dotted line 96a performs the same function as multiplier $K_1$ shown in FIG. 11. $K_1$ is established during the operation after the $B_x$ terms have been made equal. Once the $B_x$ terms have been made equal and with the moving fringe still available, the variable resistor 96 is adjusted for zero average value at the output of OP AMP 98. $K_1$ need never be changed if $A_1'$ changes due solely to optical power fluctuations.

The signal $-A_1'$ from variable resistor 96 and the output of OP AMP 91 are combined and placed on the negative input of OP AMP 98 which provides a fixed gain and is primarily used to sum $-k_1P$ and the output of OP AMP 91 to provide $-B \cos \theta_1$ at the output of OP AMP 98.

A portion of the output signal from OP AMP 94 is directed to the negative input of variable gain OP AMP 102. Variable resistor 104 is larger than resistor 106 so that both attenuation and gain may be accomplished by adjusting the gain of OP AMP 102 appropriately using variable resistor 104. The output of OP AMP 102 is passed through a voltage divider comprising resistors 108 and 110 which have the same resistance value and result in attenuating the signal by a factor of two resulting in a signal $+A_2'/2$. The output of OP AMP 92 is brought in on the positive input of OM AMP 112 and subtracted from ($A_2'/A_2$ to form $-B \sin \theta_1$ at output of OP AMP 112.

It should be noted that because power-related term $-P$ is related to the outputs from OP AMPS 91 and 93, $A_1'$ and $A_3'$ will always be in the form of an attenuation constant. Since the power-related term was not obtained using the output from OP AMP 92, $A_2'$ either can be an attenuation or can even require a slight gain factor. This is equivalent to ($K_2'/2$) shown in FIG. 11 and is essentially that portion shown within the dotted lines 120. $k_2'$, like $k_1$, is also established with the use of a moving fringe. Variable resistor 104 is adjusted for zero average value at the output of OP AMP 112. Once $k_2$ is defined, it need not be changed if $A_2'$ changes due solely to optical power fluctuations.

Though $k_1$ and $k_2'$ are not affected by optical power fluctuation due to the power-related term P, they are susceptible to changes in the background noise. Changes will occur due to misalignment of the interfering beams, contamination of optical surfaces and even improper spatial frequency. Logical combinations of the $-B \cos \theta$, $-B \sin \theta$ and $-P$ terms can be used to indicate when these conditions exist and the technique is being violated thereby introducing error.

The outputs of OP AMPS 98 and 112 are used to determine the value of $\theta_1$. Each output signal is fed to a sample and hold device 130 and 132, respectively. The sample and hold devices are primarily intended to provide a stable input and prevent any adverse affects that may result from propagation delays or timing shifts that may occur between the different signal paths.

The output of each of the sample and hold devices 130 and 132 are directed to the negative inputs of respective comparators 134 and 136 each of which use feedback hysteresis to prevent the comparator from oscillating when the signal levels are near zero volts. Use of this feedback technique insures a sharp vertical edge whenever the signal level makes a transition at or near a zero voltage level.

The output of each of the comparators 134 and 136 are fed to a pair of flip flops 138, 140 and 142, 144 respectively which delays the respective signals by one clock period with the final flip flops inverting the signal which had been once inverted by the respective comparators 134 and 136. The output of flip flop 140 is fed to the $A_{N+1}$ bit of the look-up table 160. The output of the flip flop 144 is fed to the $A_N$ bit of the look-up table 160. It is important to keep in mind that the tangent function repeats itself every 180 degrees. Therefore, in order to keep track of the phase and to have 0–360 degree resolution, the arithmetic signs of "B cos" and "B sin" terms should be maintained accurately.

A portion of the output of sample and hold device 130 is fed to the denominator input of an arctangent device 162 (Analog Device Model G39). A portion of the output of sample and hold device 132 is fed to the numerator input of the arctangent device 162 which performs the arctangent function between numerator and denominator and outputs the phase $\theta_1$ which provides voltages indicative of −90° to +90°. This output signal is fed to an analog to digital converter 166 which in turn sends a digital output signal to the $(A_{N-1})-(A_o)$ address bits in the ROM look-up table 160. It should be recognized that because the arctan function is asymptotic near + or −90°, the higher the resolution of the analog to digital converter 166, the higher will be the resolution of the quantitized phase.

The look-up table 160 uses the sign of the cosine term which has been delayed one clock period on $A_{N+1}$ input. This signal correlates with the quantitized data appearing at the output of the analog to digital converter 166. The sign of the sine term which was also delayed one clock period is fed in the $A_N$ address bit. Shown in FIG. 15, is a set of orthogonal axes which form four quadrants. The sign information contained in the sine and cosine inputs will make a determination with respect to the proper quadrant and will provide information concerning the proper angle from zero to 360 degrees and the look-up table will determine the value of the angle $\theta_1$ either in radians or degrees.

Figure 13:
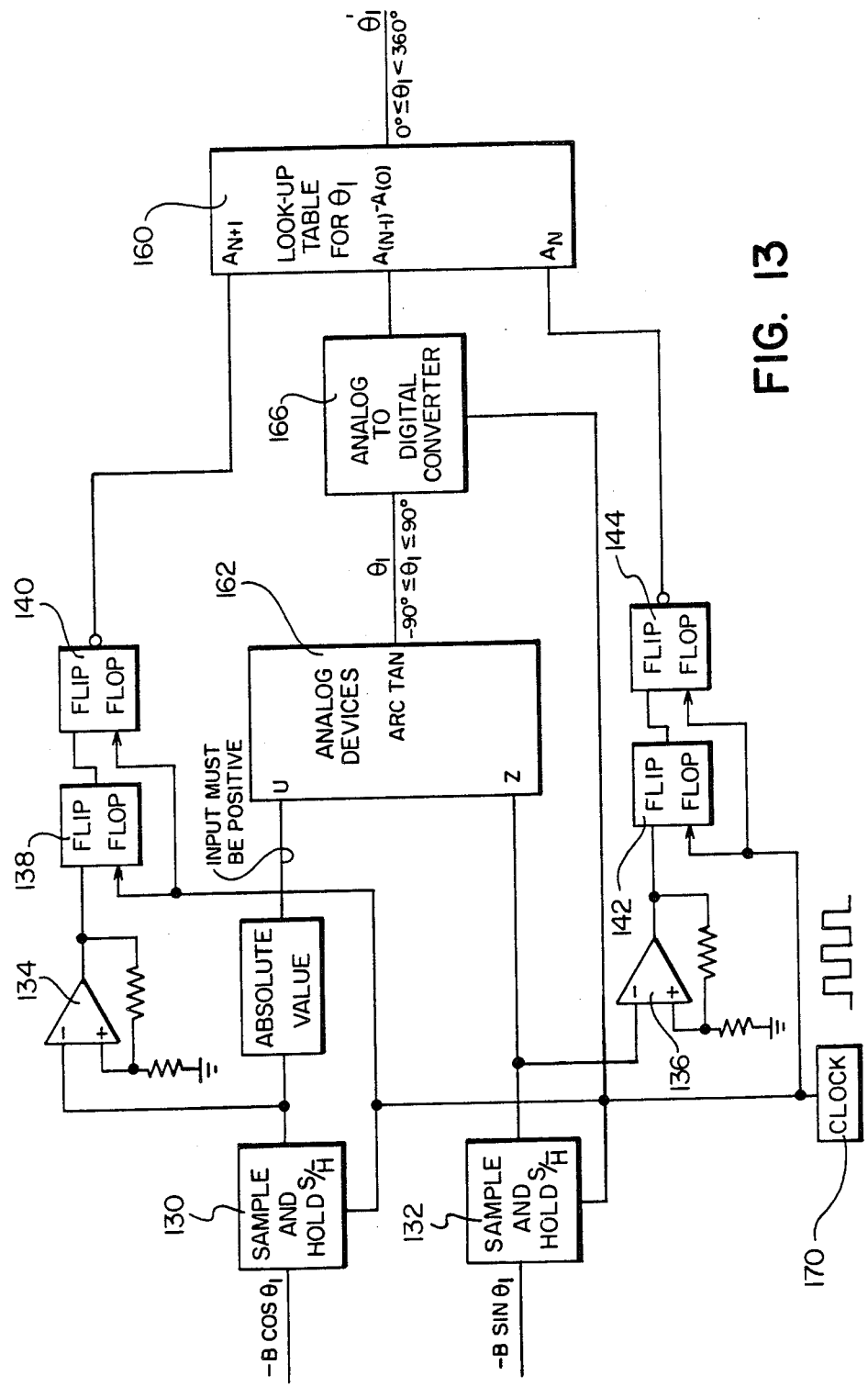
FIG. 13 illustrates another portion of the circuit partially illustrated in FIG. 12.

Also shown in FIG. 13 is the clock 170 and the necessary clocking lines that are needed to provide the required timing.

The manner of gaining displacement information will now be described. As was stated earlier, phase displacement information is derived from difference of successive phase values. Because $\theta_1$ normally ranges from 0° to 360°, error can result if successive phases were derived from different sinusoid cycles. The error results during the difference operation, since crossing cycles results in repetition of the range of phase values rather than an increment or decrement. To combat the problem, the direction of travel must be sensed using the signs of $-B \sin \theta$ and $-B \cos \theta$, in a manner known to those skilled in the art, and the phase modified to allow for logical phase differences. To aid understanding, an example will now be given:

Direction is increasing $(\theta_n > \theta_{n-1})$
$\theta_{1n-1} = 270°$ from one fringe
$\theta_{1n} = 1°$ from another fringe
$\Delta\theta_{1n} = 1° - 270° = -269°$ is in error
INSTEAD $\theta_n = 361°$ or $\theta_{n-1} = -90°$

| For | For |
|---|---|
| $\theta_n = 361$ | $\theta_{n-1} = 90$ |
| Then | Then |
| $\Delta\theta_n = 361 - 270 = 90°$ | $\Delta\theta_n = 1 - (-90) = 91$ |

Reference is now made to FIG. 14. With the quantitized phase inputs $\theta_{1n}$ and $\theta_{1n-1}$ assumed to be modified, the difference in phase $\Delta\theta_{1n}$ is output from the digital subtracter 200.

With the phase inputs, assumed to be modified, present at either $\theta'_{1n}$ or $\theta_{1n-1}$ the difference in phase $\Delta\theta_{1n}$, is then input to the adder/counter circuit block 202, which adds the lower significant bits of previously accumulated phase differences to the current phase difference. The adder/counter counts both up and down to relay both positive and negative displacement from a reference (start) point. The adder/counter must be synchronized to the events of the A/D and other functional blocks. Therefore, the clock input is essential to the blocks operation.

The computer/display interface 204 performs the conversion $(\lambda/4\pi) \Sigma\Delta\theta_n$. This block normally operates at much slower rates than blocks 200 and 202 and is usually not implemented until the data is needed. This is important since the faster the phase calculation and accumulation rate, the higher the acceptable rate of travel of the probe. Therefore, the conversion/acquisition cycle does not limit the bandwidth of the system and accurate data is available on request. The eventual accuracy and resolution obtained using this technique are highly dependent on the uniformity of the detector spacing as well as the levels of quantitization used in the analog to digital converter.

If speed is not an essential part of the operation, it is conceivable to reduce the hardware by performing much of the functions described in software.

It should be understood that even though this circuit has been illustrated in analog form the same functional results could be obtained using digital circuitry, and it is felt that the construction of such a circuit would be well within the ability of one skilled in the art, once given the detailed operations of the analog circuit described above. There are some advantages and disadvantages associated with the use of a digital approach. The digital approach would probably replace the photodiodes with a linear charged coupled device (CCD) which would necessitate the serial readout of the photosites thus increasing the operating time.

There are some advantages that come to mind when implementing the present invention digitally which would readily allow the use of a computer to go through self-calibration. If fringe motion is introduced, then the computer could re-calibrate to find a new value for $K_1$ and $K_2$ should the background noise change from application to application. Another advantage of using a computer would be to choose which photosites on the CCD best sample a fringe pattern. By providing the best spatial fit to an incident fringe, one could obtain essentially higher signal-to-noise ratios. It is to facilitate such variale spatial frequency conditions that FIG. 2 shows a number of detectors greater than four.

In the embodiments described above, the fringe pattern is created by interference of two beams, one having a path of fixed length and the other having a path of a length variable in proportion to a parameter being measured. Displacement information is derived from changes in the difference in the paths lengths. It is to be understood that the present invention includes also embodiments in which the fringe pattern is not created by interference of two beams but is formed by directing radiation onto or through any sinusoidally varying pattern such as a grating or a modified Ronchi ruling. Thus, in such cases as these, the invention might be expressed as a method of measuring the displacement of an object by analyzing a sinusoidal grating pattern the phase of which changes in direct proportion to displacement of the object. Again, the three or more detectors would be disposed to view the pattern on a line perpendicular to the pattern and with the detectors disposed on centers spaced apart by one-fourth the period of the fringe pattern. In cases such as this, instead of the intensity sensed by each detector being expressed by $A_x + B_x \cos(2\pi f_o x + (4\pi \Delta L/\lambda))$ with the displacement information being gained from changes in ΔL (the difference in lengths of the paths of the interfermoter), the intensity is expressed by $A_x + B_x \cos(2\pi/4d)(X+L)$ wherein L is a parameter which varies with the displacement of the object. Thus, in this instance, the value of the displacement is derived by accumulating changes in the value of L. However, the derivation again involves the step of adjusting the signals from the detectors so that the $B_x$ terms are rendered equal. This technique has the great advantage of allowing the frequency of the grating pattern to be greatly reduced while maintaining and even improving the resolution.

The invention has been described in detail with particular reference to a presently preferred embodiment, but it will be understood that variations and modifications can be effected within the spirit and scope of the invention.

What is claimed is:

1. An interferometer including:
   means for creating a first beam of monochromatic electromagnetic radiation;
   beam splitting means disposed in said first beam for creating second and third beams;
   radiation intensity sensing means;
   first directing means for directing said second beam along a first path of fixed length to be incident on said sensing means;
   second directing means for directing said third beam along a second path of variable length to be incident on said sensing means whereat it interferes with said second beam and creates a straight line interference pattern;
   means for varying the length of said second path in dependence on a variable being measured;
   said sensing means including at least three detectors disposed in a row extending perpendicular to the fringe pattern and disposed on centers spaced apart one-fourth the period of the fringe pattern, each of said detectors being adapted to provide a signal indicative of the intensity of radiation incident on it, said signals including a term varying sinusoidally as the pattern moves across the detectors responsive to a variation in length of said second path; said sinusoidally varying term being the product of a component indicative of the sensed amplitude of the sinusoidal variation of the radiation intensity and a sinusoidal factor including a spatial variable and the path length difference;
   means for rendering the components indicative of the sensed amplitude of the sinusoidal variation of radiation intensity of each of the three only signals of the provided by said detectors, equal; and
   means for deriving the path length difference from only said three signals.

2. An interferometer as claimed in claim 1, including means for detecting changes in difference in path length; and
   means for accumulating changes in difference in path length.

3. A method of deriving information on change in difference in path length in an interferometric device, including the steps of:
   creating a straight-line fringe pattern the phase of which changes with change of difference in path lengths of the beams in the interferometric device;
   deriving at least three signals indicative of intensity at adjacent locations at quarter-period centers on a line perpendicular to the fringe pattern;
   modifying the signals so that the factors indicative of fringe amplitude are equal; and
   deriving information on change in path length difference from three only of the modified signals.

* * * * *

UNITED STATES PATENT OFFICE
CERTIFICATE OF CORRECTION

PATENT NO. : 4,776,698

DATED : October 11, 1988

INVENTOR(S) : Fitzroy H. Crosdale

It is certified that error appears in the above-identified patent and that said Letters Patent is hereby corrected as shown below:

Column 14, lines 15 and 16, after "of" second occurrence, change "the three only signals of the provided by said detectors, equal; and" to -- three only of the signals provided by said detectors, equal; and --.

Signed and Sealed this

Sixteenth Day of May, 1989

Attest:

DONALD J. QUIGG

*Attesting Officer*    *Commissioner of Patents and Trademarks*